Sept. 11, 1956   K. E. KYLÉN   2,762,112
METHOD OF MOUNTING PAIRS OF INITIALLY
LOADED ROLLING BEARINGS
Filed Jan. 30, 1953   2 Sheets-Sheet 1

Inventor:
Karl Erik Kylén
by his Attorneys
Howson & Howson

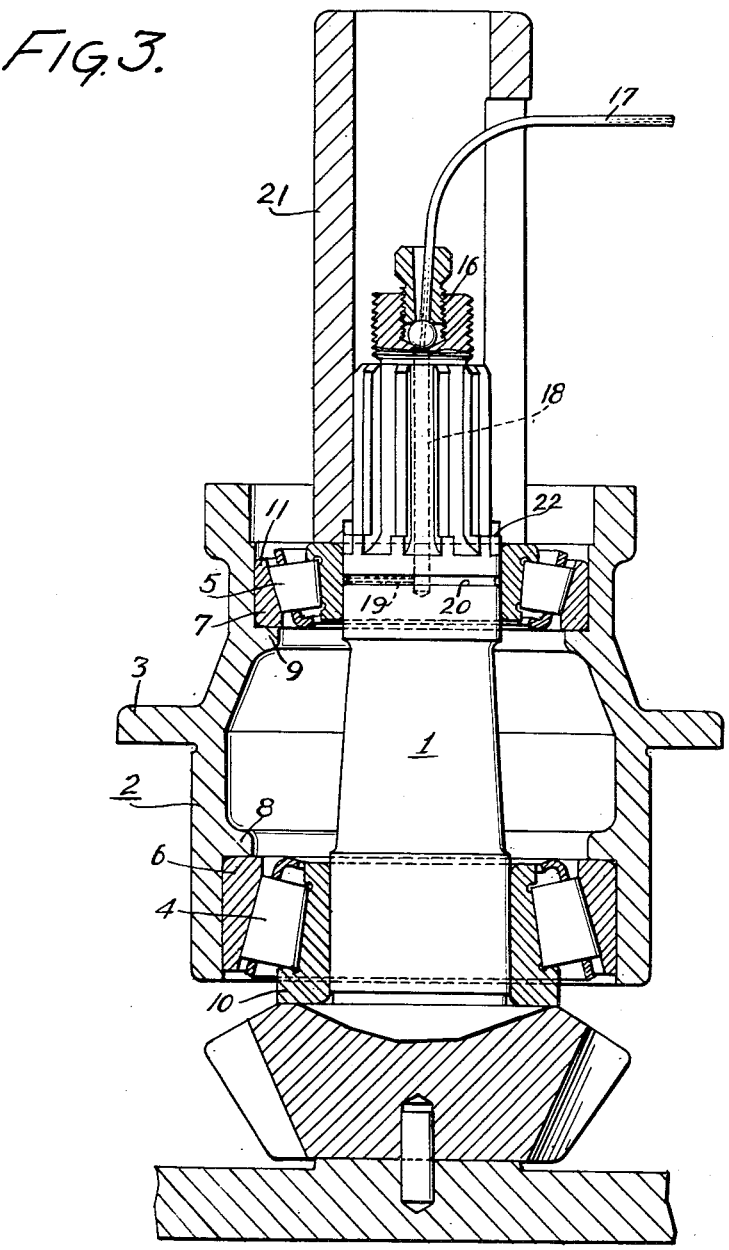

United States Patent Office 2,762,112
Patented Sept. 11, 1956

2,762,112

METHOD OF MOUNTING PAIRS OF INITIALLY LOADED ROLLING BEARINGS

Karl Erik Kylén, Goteborg, Sweden, assignor, by mesne assignments, to SKF Industries, Inc., Philadelphia, Pa., a corporation of Delaware Application January 30, 1953, Serial No. 334,345

3 Claims. (Cl. 29—148.4)

In certain rolling bearing mountings, for instance in bevel gears, it is necessary to locate the rings of the rolling bearings relative each other so that an initial load will be imposed on the bearings in order to decrease, or prevent, axial displacement of the shaft, which has a detrimental effect on the action of the gears, when the bearings are subjected to thrust load. It has hitherto been impossible to adjust the bearings to obtain the same predetermined initial load in all cases. The result has been that in certain cases the initial load has been insufficient while in other cases it has been so great that the bearings run hot. The present invention has for its purpose to simplify the mounting of the bearings for the above mentioned purpose and further to permit of the application of a predetermined initial thrust load on the bearings.

Figure 1:
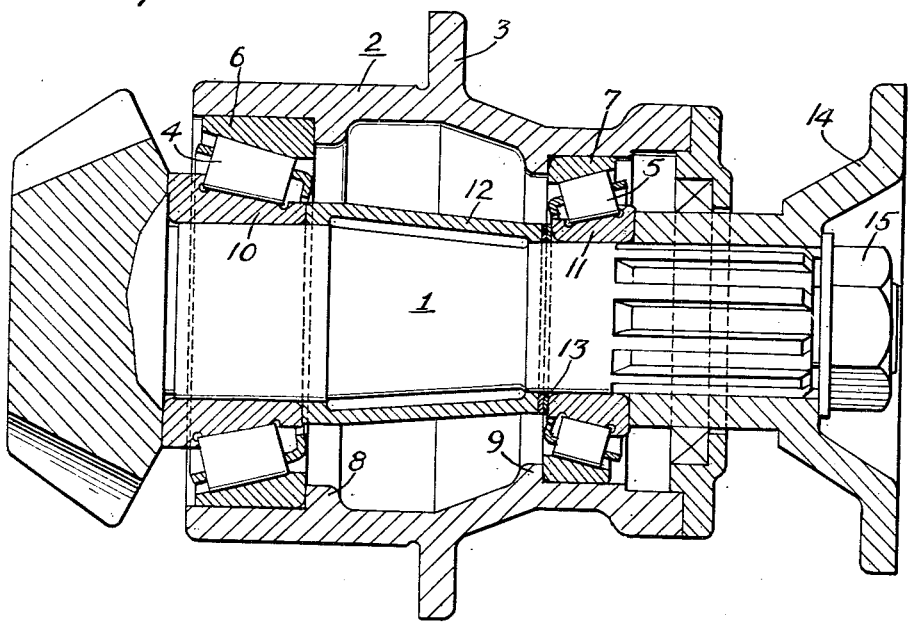
Figure 2:
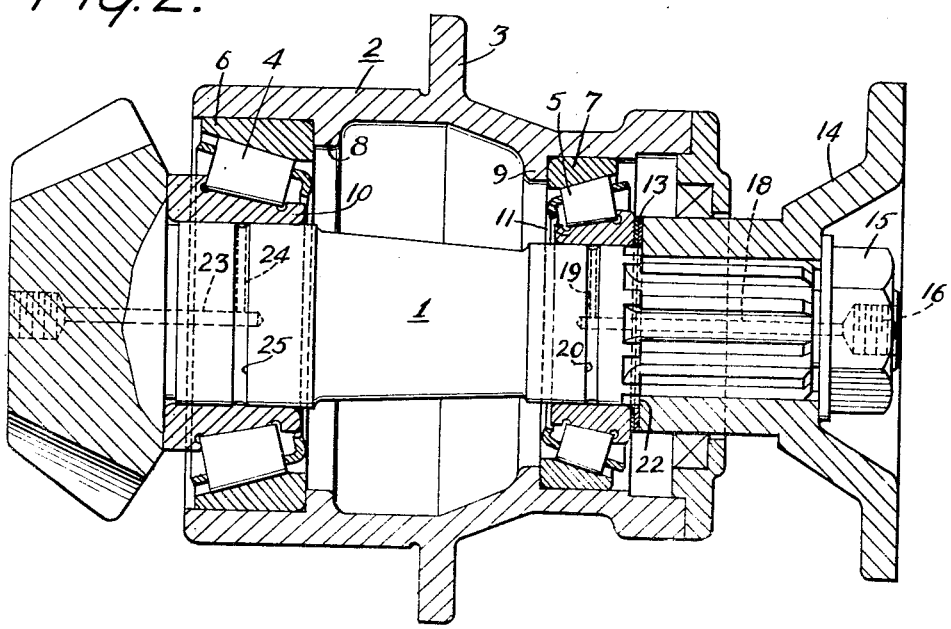

The method according to the invention is further described in connection with the attached drawings in which Fig. 1 shows the usual method of mounting a bevel gear. Fig. 2 illustrates a mounting suitable for use with the method according to the invention and Fig. 3 illustrates the application of the method.

In Fig. 1, the numeral 1 indicates the shaft of a bevel gear and 2, the bearing housing. The housing is provided with a flange 3 by which it can be connected to a gear box. In the housing are mounted two bearings, in this case two taper roller bearings 4 and 5, the outer rings 6 and 7 of which abut against shoulders 8 and 9 in the housing. The inner rings 10 and 11 must be mounted with a force fit on the bearing seats. A shaft of this type is mounted with the aid of a device, by means of which the distance between the inner rings can be measured. Preferably, the outer rings of the bearings, are first mounted in the housing, after which the bearings are mounted on a mandrel on which the tolerances of the bearing seats are such that the inner rings will have a loose fit. When the distance between the inner rings has been measured, the length of a sleeve 12 and shims 13, applied between the inner rings is determined, so that when the bearings are mounted on the gear shaft, a certain initial load will be imposed on them. When the coupling 14 is attached to the shaft by the nut 15, it will press the inner ring 11 of the bearing 5 firmly against the sleeve 12.

It is also possible to attain a suitable initial load by repeatedly mounting the inner ring of the bearing 5 and determining the suitable thickness of the shims 13 by trial.

The resulting initial load can be checked by measuring the torque required to turn the shaft in the bearings. This torque will, however, vary within wide limits, because the initial load varies due to the fact that the expansion of the inner ring 11 caused by the interference between the shaft and the bearing ring will vary according to the variation of the diameters of the bore of the bearing and the bearing seat within their tolerance limits.

Figures 2 and 3 show how the above mentioned difficulties may be avoided by using the method according to the invention. One end of the shaft 1 is provided with a thread 16 for connecting to an oil pressure pipe 17 (Fig. 3). Communicating with this connection is an axial channel 18 and a radial channel 19. The channel 19 opens at the seat of the bearing into a peripheral channel 20. The inner ring may be mounted on a seat by heating it to expand the ring or by pressing it onto the seat, the ring being located so that there will be some axial play in the mounting. Oil or other suitable fluid is now pressed from an injector (not shown) between the shaft and the bearing through the pipe 17 and channels 18, 19 and 20, until the inner ring floats on the shaft, or in other words, until metallic contact no longer exists between ring and shaft or said contact is substantially eliminated. A thrust load is now imposed on the inner ring of the bearing with the aid of a sleeve 21 (Fig. 3). Since the inner ring 11 in effect floats on the oil film, which has been formed between the bearing and the seat, the bearings will always be subjected to an initial load substantially corresponding to the load on the sleeve. While the inner ring 11 is still under load, the pipe 17 is disconnected, whereby the oil under the bearing will be drained off and the bearing becomes firmly seated on the shaft, since the fit between bearing and seat is such that the bearing cannot be displaced by the thrust forces to which it is subjected. The conventional spacer sleeve 12 shown in Fig. 1 now becomes unnecessary and may be eliminated. The shaft 1 is provided with a shoulder 22 against which the coupling 14 abuts under the action of the nut 15. There should then be a certain amount of play between the coupling 14 and the inner ring 11. This play can now be measured and suitable shims of a thickness corresponding to the play, may be inserted between the inner ring of the bearing and the coupling. When the nut 15 is tightened, the inner ring will therefore not be displaced axially, but is instead locked against displacement, which might otherwise result in a decrease in the initial load.

Through this method it is possible to mount the inner ring 11 with a harder fit than has hitherto been possible. When the bearing is to be removed pressure fluid is again forced in between the bearing ring and the bearing seat whereby the bearing can easily be withdrawn. The inner ring of the bearing nearest the bevel gear can also suitably be removed with the aid of pressure fluid. For this purpose channels 23, 24 and 25 are provided.

In certain cases it may be desirable to fit the inner rings of the bearings against shoulders on the shaft. The initial load is obtained in such cases by suitably locating the outer race rings for which purpose channels may be provided in the housing for leading pressure fluid between the outer race rings and their seats in the housing. In this case the bearings must of course be reversed.

The invention can be used in the mounting of all types of rolling bearings capable of carrying thrust loads, for instance angular contact bearings, deep groove ball bearings and spherical ball and roller bearings.

I claim:

1. The method of mounting pairs of initially loaded rolling bearings, characterized thereby, that at least one of the bearings is mounted while providing between the bearing and its seat a film of pressure fluid under such pressure that it substantially eliminates metallic contact between bearing and the seat and at the same time imposing a thrust on the bearing, corresponding substantially to the desired initial load.

2. The method of mounting pairs of initially loaded rolling bearings, said method comprising the steps of providing between at least one of said bearings and its seat a film of pressure fluid under such pressure that it substantially eliminates metallic contact between said seat and bearing, imposing a thrust on the bearing corresponding substantially to the desired initial load, and subsequently withdrawing the film to restore said metallic contact.

3. The method of mounting a pair of mutually axially opposed rolling bearings between shaft and housing members having seats for said bearings and wherein means is provided for relatively fixing the bearings axially in positions wherein they impose upon each other an axial pre-load, said means including metal-to-metal binding contact between at least one of said bearings and its seat on one of said members, said method comprising the steps of providing between the said one bearing and its said seat a film of pressure fluid under such pressure that it substantially eliminates the said metallic contact between said seat and bearing, imposing a thrust on the bearing in direction tending to move the bearing axially toward the other bearing and corresponding in magnitude substantially to the desired pre-load, and withdrawing the film to restore said metallic contact while maintaining said thrust.

References Cited in the file of this patent

UNITED STATES PATENTS

| | | |
|---|---|---|
| 961,375 | Seabrook | June 14, 1910 |
| 1,457,781 | Loughead | June 5, 1923 |
| 1,461,130 | Loughead | July 10, 1923 |
| 1,599,905 | Loughead | Sept. 14, 1926 |
| 1,748,971 | Buckwalter | Mar. 4, 1930 |
| 2,084,439 | Hamer | June 22, 1937 |
| 2,118,756 | Bergert | May 24, 1938 |
| 2,348,293 | Hamer | May 9, 1944 |